March 10, 1936.　　　　R. O. OAKLEY　　　　2,033,734
SCREEN
Original Filed March 24, 1931　　2 Sheets-Sheet 1
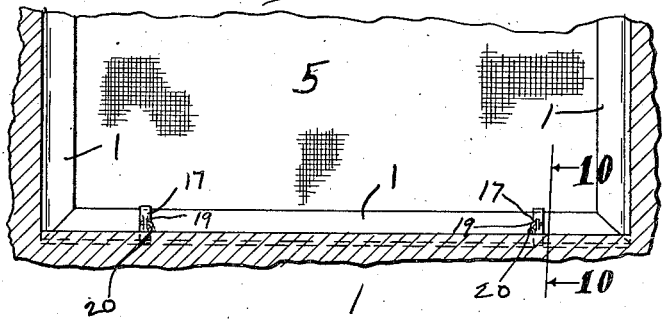
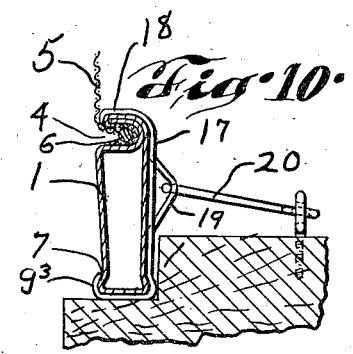
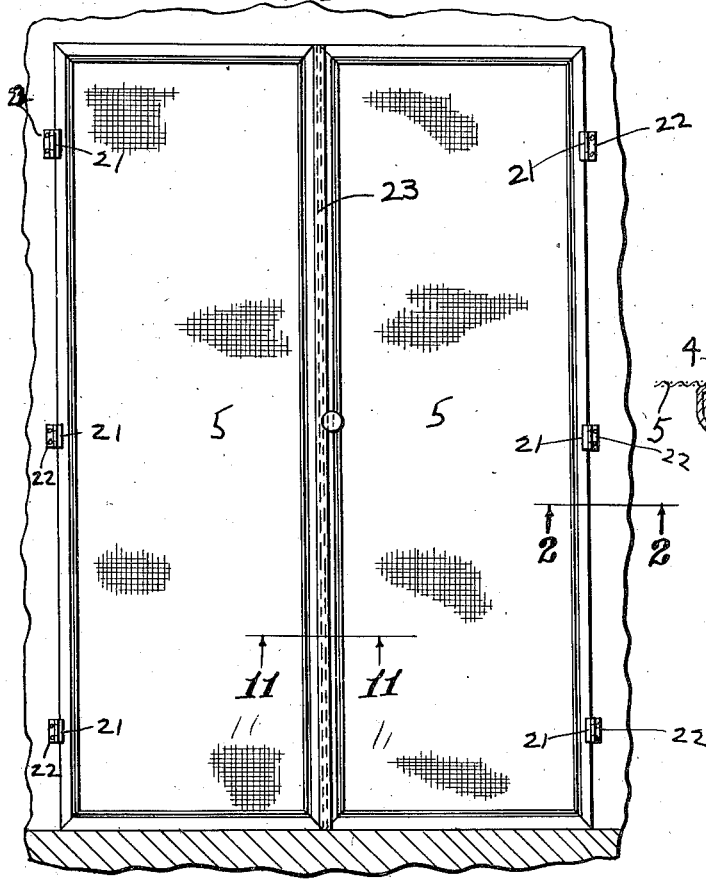
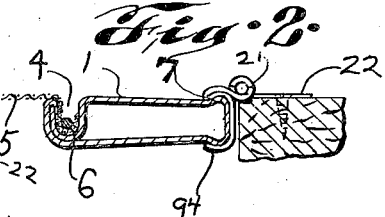
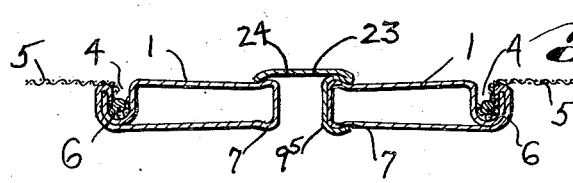
INVENTOR
Richard O. Oakley
BY Henry Kincaid
ATTORNEY

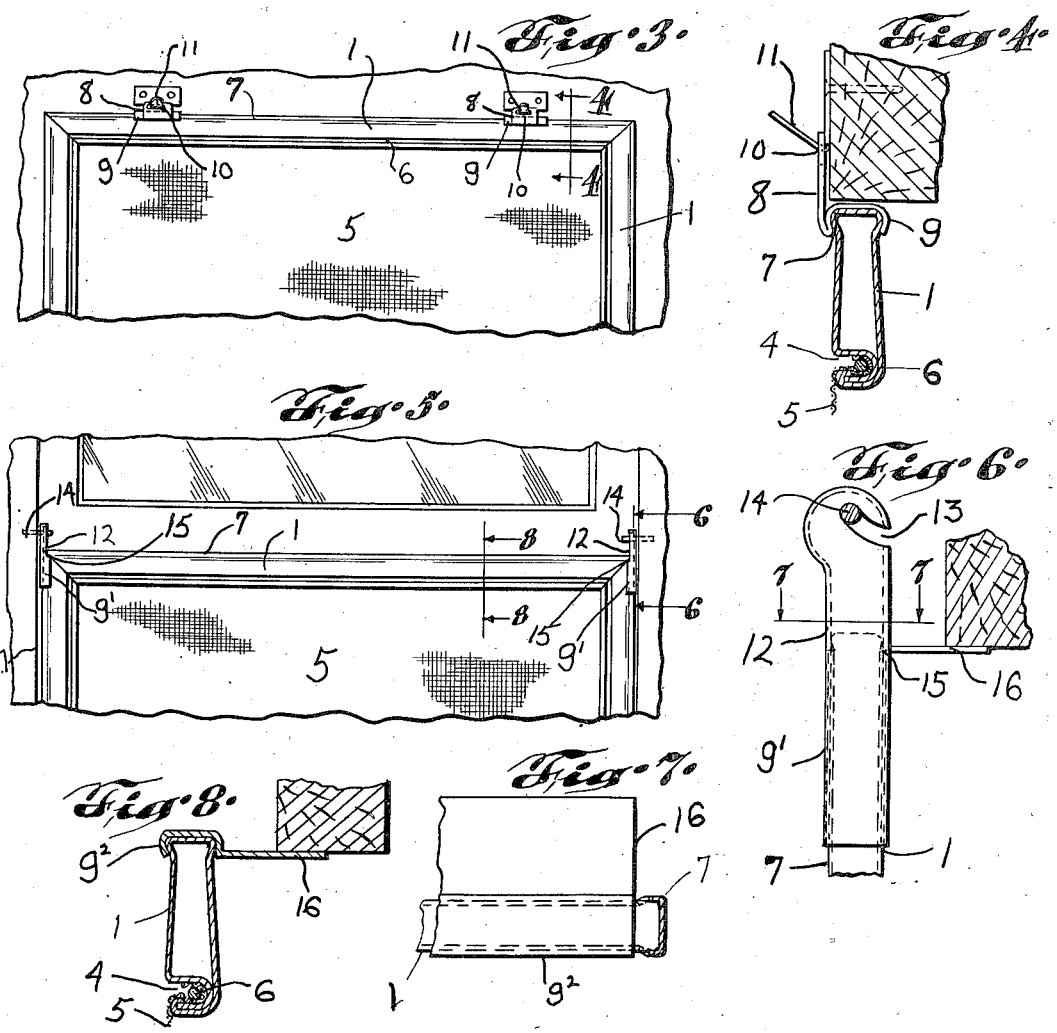

Patented Mar. 10, 1936

2,033,734

UNITED STATES PATENT OFFICE 2,033,734

SCREEN

Richard O. Oakley, St. Louis, Mo.

Application March 24, 1931, Serial No. 524,895
Renewed July 31, 1935

5 Claims. (Cl. 156—14)

My invention relates to screens used in door and window openings in houses and more particularly to such screens having a metal frame, that is, having the longitudinal and transverse members of the frame formed of metal.

Heretofore, although it has been recognized generally that metal frame screens have a longer life and for this and other reasons give the most satisfactory results the use of a metal frame presented difficulties which have not been overcome. Door and window openings vary greatly in size in different houses and, therefore, the size of the screens must be varied likewise. When it was desired to install metal screens because of the fact that the metal frame members were welded together at the corners of the screen and because of the fact that the complementary accessories necessarily required to hang the screen had to be bolted or welded to the frame after its completion it was necessary to measure the openings to be screened and forward the measurements so obtained to the manufacturer of the metal screens so that screens of the proper size could be made. In effect, each screen was custom made and, therefore, the cost of metal screens was very high.

The object of my invention is to provide a metal screen so constructed that the metal rail used to form the frame may be cut into the required lengths at the place where the screen is to be hung and the frame may be assembled quickly and easily and the complementary accessories for hanging the screen may be attached to the frame independently of any fastening means such as bolts, rivets or welding.

Embodiments of my invention are fully shown in the accompanying drawings wherein Fig. 1 is a view of a hingedly mounted screen such as used on door and casement window openings; Fig. 2 is a section along the line 2—2 in Fig. 1. Fig. 3 is a fragmentary view of a full hung screen in place on a window; Fig. 4 is a section along the lines 4—4 in Fig. 3; Fig. 5 is a fragmentary view of a half hung screen in place on a window; Fig. 6 is a view along the lines 6—6 in Fig. 5; Fig. 7 is a view along the line 7—7 in Fig. 6; Fig. 8 is a detail of one of the accessories taken on line 8—8 of Fig. 5; Fig. 9 is a partial view of the inside portion of the screen at the bottom of the window; Fig. 10 is a section along the lines 10—10 in Fig. 9; and Fig. 11 is a section along the line 11—11 in Fig. 1.

Referring to the figures the various types of screen shown therein all embody the same form of my invention and include in each case the complementary accessories used for hanging the screens, but it will be understood from the description given below that the accessories even though their form necessarily must be varied to hang screens of different types all embody the same principle and are attached to the frame of the screen in the same way.

Referring to the figures a screen embodying my invention as shown herein comprises hollow members 1 of metal and arranged to meet, preferably, at an angle of forty five degrees to form a frame upon which the screen wire is stretched. Adjacent ends of adjacent frame members 1 are attached to one another by any suitable expedient. By cutting the frame members 1 in desired lengths and then attaching the adjacent ends of adjacent members together a screen of any desired size may be quickly assembled.

The frame members 1 preferably have on their inner edges a groove 4 into which is rolled the marginal edge of the screen 5 and a retaining strip 6 to hold the screen in stretched position on the frame, as shown in Fig. 8.

A screen embodying my invention has a part of the frame and portion of an accessory used to hang the screen formed and arranged to interlock whereby the accessory is maintained in fixed position on the screen. The outer edge of the frame members 1, in this embodiment of my invention, is thickened to form a rib 7 with outwardly divergent walls and to this rib are fixed the complementary accessories used for hanging screens. Each of the complementary accessories has a portion arranged to form a groove following generally the contour of the rib 7 so as to interlock therewith.

These accessories may be of various forms and shapes as required, but I have shown some which are most common in use. In Figs. 3 and 4 I have shown an accessory 8 used to hang full hung screens and having a portion 9 thereof interlocking with the rib 7 of the frame member. The accessory 8 has an opening 10 therein to receive a hook 11 carried by the frame of the window. In Figs. 5 and 6 is shown an accessory 12 used to hang half hung screens and this accessory has the portion $9^1$ thereof interlocking with the rib 7 of the frame member and the accessory has an upwardly extending part having a notch 13 adapted to engage a pin 14 carried by the window frame. The upper end of the portion $9^1$ terminates at a shoulder 15 which bears against the rib 7 on the upper transverse frame member 1 and thereby prevents the accessory 12 from moving longitudinally of the side frame member by which it is carried when the screen is hung. Figs. 7 and 8 show a header bar 16 used to fill the space between the screen frame and the meeting rail of the window sash and has the portion 9² adapted to interlock with the rib 7 of the transverse member of the screen by which the header bar is carried. In Figs. 9 and 10 is shown the accessory 17 used to hold window screens in closed position and this accessory includes the portion 9³ having a groove to interlock with the rib 7 on the lower frame member and also includes the part 18 which extends over the opposite or inner edge of the frame member. This accessory has formed therein an eye 19 to engage a hook 20 pivotally mounted on the window sill.

In Figs. 1, 2, and 11, as stated above, my invention is shown embodied in a screen hung on hinges as used in door or casement window openings and in Fig. 2 is shown a detail of the accessory used in hanging such screens and which is in the form of a hinge 21 having the portion 9⁴ thereof formed to interlock with a rib 7 on the frame member and which has a leaf 22 adapted to be fastened to the window frame by any suitable means. In Fig. 11 is shown a detail of an astragal 23 having the part 9⁵ adapted to interlock with the rib 7 on the frame member and having a part 24 to extend across the space between the screens.

In assembling screens the metal rail used to form the frame members is cut in desired lengths and as stated above is preferably cut at an angle of forty-five degrees. These members are then joined at adjacent ends by any suitable expedient after the desired and needed accessories are slid onto the ribs 7 of the frame member on which they are to be carried.

I prefer that the portions of the accessories in engagement with the outer edge of the frame have a firm frictional contact therewith so as not to be easily moved longitudinally of the frame member out of desired position. However, after the accessories are in place and the screens are painted as is the usual practice the film of paint will hold the accessories in position and will keep them from moving.

As stated above, I have shown in the drawings and described herein, only one embodiment of my invention, but I do not intend to limit myself to this embodiment since it will be understood that the form of interlocking engagement between the accessories and the frame members may be varied within wide limits without deviating from the spirit of my invention as included in the appended claims.

What I claim as new and desire to secure by Letters Patent, is:—

1. In combination a screen of the class described having a frame comprising longitudinal and transverse members, complementary accessories for hanging said screen, and a part of said frame and a portion of each of said accessories being interlockable whereby each accessory may be attached to said frame at any one of a plurality of points and will be maintained in fixed position on said frame at said point.

2. In combination a screen of the class described having a frame comprising longitudinal and transverse members, complementary accessories for hanging said screen, and the outer edge of one of said frame members and a portion of each of said accessories being interlockable whereby each accessory may be attached to said frame at any one of a plurality of points and will be maintained in fixed position on said frame at said point.

3. In combination a screen of the class described having a frame comprising a member having the outer edge thereof formed with a rib, accessories complementary with said rib for hanging said screen, each having having a portion interlockable with said rib whereby said accessory may be attached to said member at any one of a plurality of points and will be maintained in fixed position on said frame member at said point.

4. In combination a screen of the class described having a frame comprising a member having the outer edge thereof formed with a rib with outwardly divergent walls, and accessories complementary with said rib for hanging said screen, each having a portion formed with a groove to receive said rib and interlockable therewith whereby said accessory may be attached to said member at any one of a plurality of points and will be maintained in fixed position on said frame at said point.

5. In combination a screen of the class described having a frame comprising a member having the outer edge thereof thickened to form a rib with outwardly divergent walls, and accessories complementary therewith for hanging said screen, each having a portion formed with a groove having the walls thereof following the contour of said rib to interlock therewith, whereby each accessory may be attached to said member at any one of a plurality of points and will be maintained in fixed position on said frame at said point.

RICHARD O. OAKLEY.